(12) United States Patent
Srikrishna et al.

(10) Patent No.: US 9,185,631 B2
(45) Date of Patent: Nov. 10, 2015

(54) DETERMINATION OF WHETHER TO ADMIT A MOBILE DEVICE TO A HOT SPOT

(71) Applicants: Devabhaktuni Srikrishna, San Francisco, CA (US); Shankar Venkatraman, San Jose, CA (US)

(72) Inventors: Devabhaktuni Srikrishna, San Francisco, CA (US); Shankar Venkatraman, San Jose, CA (US)

(*) Notice: Subject to any disclaimer, the term of this patent is extended or adjusted under 35 U.S.C. 154(b) by 37 days.

(21) Appl. No.: 14/301,568

(22) Filed: Jun. 11, 2014

(65) Prior Publication Data

US 2014/0370893 A1    Dec. 18, 2014

Related U.S. Application Data

(60) Provisional application No. 61/834,414, filed on Jun. 12, 2013.

(51) Int. Cl.
*H04W 48/20* (2009.01)
*H04W 48/02* (2009.01)
*H04W 84/04* (2009.01)

(52) U.S. Cl.
CPC ............ *H04W 48/02* (2013.01); *H04W 84/045* (2013.01)

(58) Field of Classification Search
CPC .................................................... H04W 48/20
USPC ......... 455/435.2, 435.1, 436–444, 41.1–41.2, 455/446, 561, 550.1
See application file for complete search history.

(56) References Cited

U.S. PATENT DOCUMENTS

| 9,066,227 | B2* | 6/2015 | Spencer .................. G06F 15/16 455/466 |
| 2009/0047968 | A1* | 2/2009 | Gunnarsson .......... H04W 48/12 455/446 |
| 2015/0113039 | A1* | 4/2015 | Laurikari ................ H04L 67/18 709/202 |
| 2015/0131525 | A1* | 5/2015 | Yang ....................... H04W 8/00 370/328 |
| 2015/0139097 | A1* | 5/2015 | Kronander ............ H04W 76/02 370/329 |

* cited by examiner

*Primary Examiner* — Cong Tran
(74) *Attorney, Agent, or Firm* — Brian R. Short (57) ABSTRACT

Systems, methods and apparatuses of determining whether to admit the mobile device to the hot spot are disclosed. One method includes establishing communication between a hot spot and a mobile device, determining a first level of communication directly between the mobile device and a cellular network, determining a second level of communication between the mobile device and the cellular network through the hot spot, and identifying a fraction of other mobile devices having a level of communication directly with the cellular network. The method further includes determining whether to admit the mobile device to the hot spot based on a comparison of the first level of communication with the second level of communication, and the fraction of other mobile devices having a level of communication directly with the cellular network that is either better or worse than the first level of communication.

21 Claims, 6 Drawing Sheets

DETERMINATION OF WHETHER TO ADMIT A MOBILE DEVICE TO A HOT SPOT

RELATED APPLICATIONS

This patent application claims priority to U.S. Provisional Patent Application 61/834,414 filed Jun. 12, 2013, which in hereby incorporated by reference.

FIELD OF THE DESCRIBED EMBODIMENTS

The described embodiments relate generally to wireless communications. More particularly, the described embodiments relate to systems, methods and apparatuses for determining whether to admit a mobile device to a hot spot.

BACKGROUND

The use of battery-powered, mobile devices is becoming increasingly prevalent, such as the iPhone®, iPad® and Android® devices. Some of these devices are connected to cellular networks on Long Term Evolution (LTE) networks while others connect to the Internet using Wi-Fi networks which are also a type of cellular network. Cellular network operators need to keep up with the traffic load imposed by increasing user devices and surge in demand for higher speed, reliable connections to an increasing number of mobile users.

In large cities with hundreds of thousands of mobile devices connected to cellular networks, some fraction of devices suffer from low quality cellular connections to the base stations comprising the cellular network.

The quality of the Internet connection of mobile devices in the cell edge may be improved significantly if the mobile devices can connect to the cellular network via hot spots. Hot spots are mobile devices with higher quality connections typically located outside the cell edge. Physically, this is similar to how small cells or pico base stations improve the connection to the macro base stations, however base stations are typically fixed location, AC powered, and therefore do not have a limited battery life. Unlike cells with fixed locations, the use of hot spots can be adaptive to changes and movements of groups of users.

It is common for a mobile device with a cellular network connection to also function as a hot spot whereby other mobile devices can connect wirelessly to the cellular network via the hot spot. The advantage of the hot spot is that it relays traffic between the cellular network and the mobile devices connected to it at a better connection quality than would otherwise be available to the mobile device. For example the iPhone® running on Verizon® Wireless cellular network may act as a hot spot by providing a Wi-Fi connection to an iPad®. The cellular network connection and the hot spot connection may operate in the same frequency band or in a different frequency band.

Mobile devices are typically not allowed to connect to hot spots unless explicitly authorized by the cellular network subscriber who owns the hot spot. Since hot spots are also mobile devices with limited battery life, allowing all other public devices to connect to the hot spot without any admission control may quickly drain the batteries of hot spots or consume their available capacity when connecting to the cellular network. Typically, there is no automated admission control which will permit cell edge users to connect to hot spots of other users without the owner granting permission. Hot spots accept only mobile devices authorized by their owner less than some maximum number of connections (e.g. 3, 10, etc) to limit the amount of traffic load that they support for mobile devices within an acceptable level (e.g. 20-50% of the capacity available to the hot spot from the cellular network).

If an admission control policy based on mobile device limits were extended to include all other mobile devices using the cellular network, it may result in a large fraction of mobile device connected to the hot spots and may not end up connecting the cell edge devices which would benefit the most. Furthermore, if a large number of mobile devices were connected to hot spots, it may also trigger a large number of disconnections in the network when hot spot devices move around or hot spot devices are shut off. If there is no control on which mobile devices connect to hot spots, since hot spots are also mobile devices they may in turn connect to other hot spots leading to a large hop count in the network.

The presence of a hot spot can be broadcast to notify nearby mobile devices. Limits and reduction of the broadcast transmission power of the hot spot may reduce the number of nearby public mobile devices that may learn about and attempt to connect to the hot spot. Without additional protocols broadcast power alone does not discriminate and prioritize the cell edge users that stand to gain the most from other mobile devices that may get only a marginal improvement in connection quality.

It is desirable to create an admission control scheme for all mobile devices to hot spots that minimizes mobile battery usage of devices with hot spots, minimizes cellular network disconnections, while incentivizes owners of hot spots to share their scarce resources to achieve maximum improvement in quality of Internet connections for the mobile devices by prioritizing the cell edge.

SUMMARY

An embodiment includes a method of determining whether to admit the mobile device to the hot spot. The method includes establishing communication between a hot spot and a mobile device, wherein the hot spot comprises at least one of a fixed device hot spot or a mobile device hot spot. The method further includes determining a first level of communication directly between the mobile device and a cellular network, wherein the first level of communication is based on at least one of a level of performance or a level of quality of communication directly between the mobile device and the cellular network, determining a second level of communication between the mobile device and the cellular network through the hot spot, wherein the second level of communication is based on at least one of a level of performance or a level of quality of communication between the mobile device and the cellular network through the hot spot, and identifying a fraction of other mobile devices having a level of communication directly with the cellular network that is either better or worse than the first level of communication, wherein the level of communication is greater than a minimal threshold. The method further includes determining whether to admit the mobile device to the hot spot based on a comparison of the first level of communication with the second level of communication, and the fraction of other mobile devices having a level of communication directly with the cellular network that is either better or worse than the first level of communication.

Another embodiment includes a hot spot. The hot spot includes a wireless transceiver and a controller. The controller is operative to establishing communication with a mobile device through the wireless transceiver, obtain a first level of communication directly between the mobile device and a cellular network, wherein the first level of communication is based on at least one of a level of performance or a level of quality of communication directly between the mobile device and the cellular network, determine a second level of communication between the mobile device and the cellular network through the hot spot, wherein the second level of communication is based on at least one of a level of performance or a level of quality of communication between the mobile device and the cellular network through the hot spot, identify a fraction of other mobile devices having a level of communication directly with the cellular network that is either better or worse than the first level of communication, wherein the level of communication is greater than a minimal threshold. The controller if further operative to determine whether to admit the mobile device to the hot spot based on a comparison of the first level of communication with the second level of communication, and the fraction of other mobile devices having a level of communication directly with the cellular network that is either better or worse than the first level of communication.

Other aspects and advantages of the described embodiments will become apparent from the following detailed description, taken in conjunction with the accompanying drawings, illustrating by way of example the principles of the described embodiments.

DETAILED DESCRIPTION

The described embodiments provide systems, methods and apparatuses for providing hot spots to mobile devices. At least some embodiments include an admission control and incentive scheme for connecting mobile devices to the hot spots, wherein the hot spots are connected to a cellular network. At least some embodiments include prioritizing admission control for mobile devices located at a cell edge, and assigning a credit to hot spot in proportion to the resources the hot spot consumes for relaying a packet between the mobile device and the cellular network. By prioritizing admission for mobile devices which stand to gain the most in terms of connection quality and assigning credits to hot spots which may be utilized by a hot spot in the future, the owner of the hot spot has an incentive to participate and provide improved connectivity for other mobile devices on the cellular network. At least some of the described embodiments include a focus on assignment of credits to hot spots and prioritizing admission to hot spots for mobile devices that benefit the most in terms of connection quality to the cellular network.

For the described embodiments, a hot spot refers to a site that provides Internet access. A hot spot may be mobile or stationary. For at least some embodiments, hot spot devices include mobile devices that are connected to a cellular network that provides hot spot to other mobile devices. For the described embodiments, airtime refers to the amount of time a mobile device is connected and passing data or traffic to or from the cellular network. For the described embodiments, a cell edge may be defined as mobile devices experiencing the worst N % of quality (of the mobile devices connected to a hot spot) where N is any number between 0 and 100 (e.g. in one embodiment N maybe 5). Battery consumption of a mobile device refers to the power consumed by the hot spot device in providing hot spot to other devices.

When the mobile devices and cellular networks are relaying data transmissions via the hot spot, the hot spot device consumes resources that would otherwise be available for transmissions and receptions of packets originating and terminating on the hot spot. In order for the subscribers of hot spots to opt in and permit the relaying function, it is desirable to provide an incentive for the hot spots to consume these resources on behalf of the mobile device. Any hot spot device providing its resources to relay other traffic accumulates credits proportionally quantified as much as the resource usage, and then may use these credits to claim resources to transmit its own data in the future on other hot spots.

Figure 1:
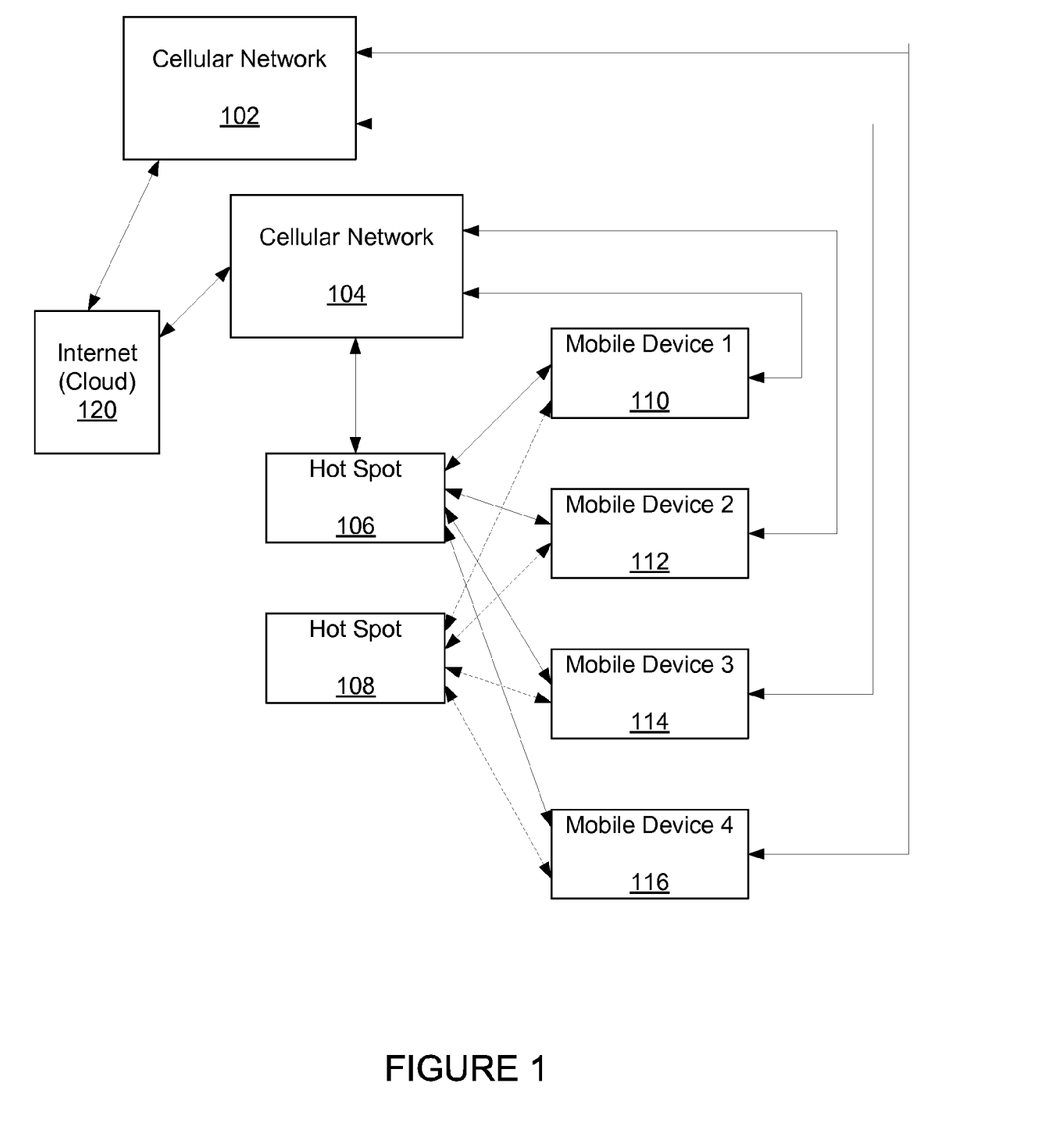
FIG. 1 is a block diagram of a system of providing hot spots to mobile devices, according to an embodiment.

FIG. 1 is a block diagram of a system that includes hot spots 106, 108 for providing mobile devices 110, 112, 114, 116 access to a cellular network (such as, cellular networks 102, 104), according to an embodiment. For at least some embodiments, the system includes one or more hot spots 106, 108 connected to one or more different cellular networks 102, 104. The mobile devices 110, 112, 114, 116 can connect to any of the hot spot 106, 108. Further, for at least some embodiments, the mobile devices 110, 112, 114, 116 and hot spots 106, 108 are connected to a cell in a cellular network 102, 104 of one or more cells. The cellular networks 102, 104 are in turn connected to the Internet 120 providing Internet access to the mobile device 110, 112, 114, 116 and the hot spot 106, 108. For at least some embodiments, the cells are remotely managed and operated via one or more control servers which are included as part of the cellular networks 102, 104.

Figure 2:
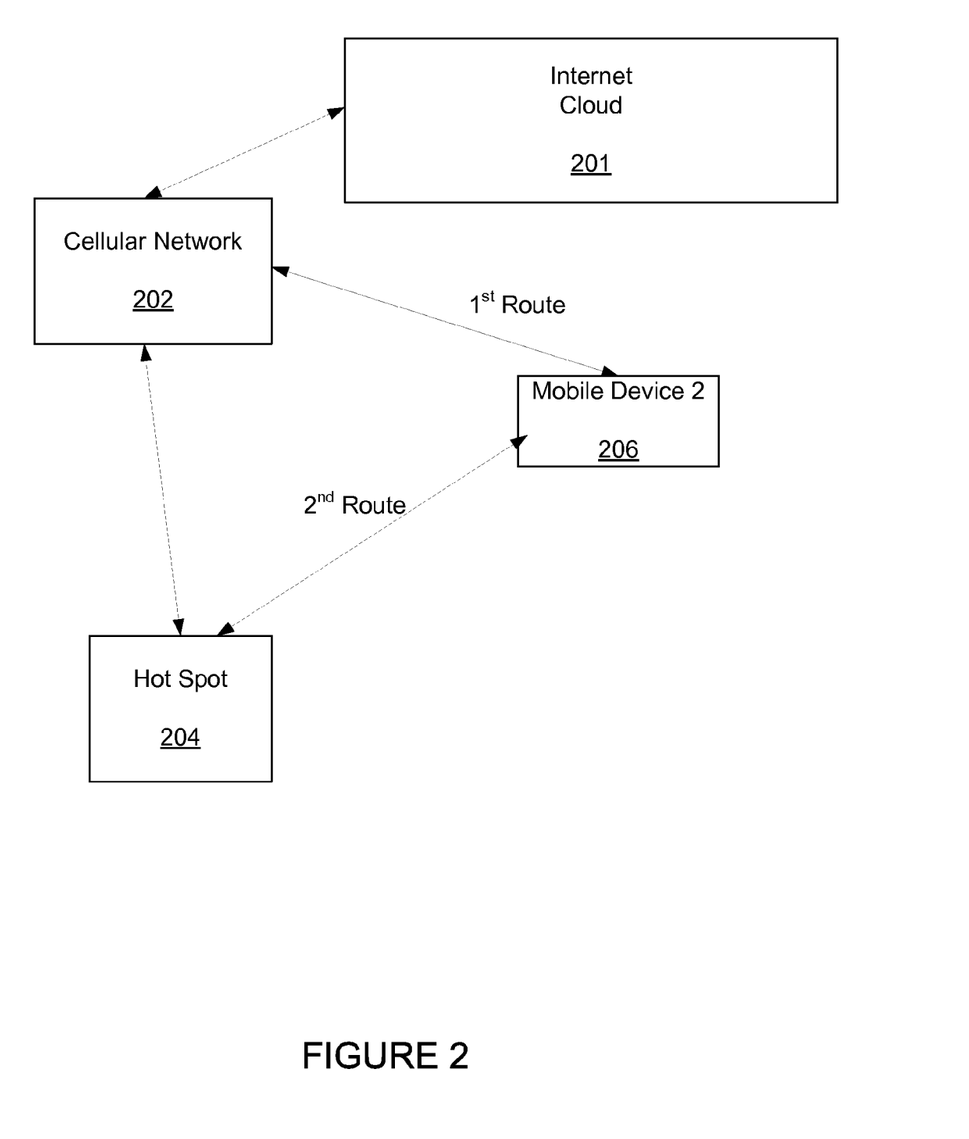
FIG. 2 is a block diagram of a system that includes connections of the system of FIG. 1, according to an embodiment.

FIG. 2 is a block diagram of a system that includes connections of the system of FIG. 1, according to an embodiment. A 1st route refers to mobile device 206 connection to a cellular network 202 directly. Alternately, mobile device 206 can connect to cellular network 202 by first connecting to hot spot 204 in a 2nd route. In the described embodiments, a first level of communication refers to the quality of connection between the mobile device 206 and a cellular network 202 when connected directly via the 1st route; and the second level of communication refers to the quality of connection between the mobile device 206 and the cellular network 202 through hot spot 204, that is, through the 2nd route. For at least some embodiments, the cellular network is connected to the internet (cloud) 201.

The first level or the second level of communication of a wireless connection between the mobile device 206 and the Internet may be determined by any of measurements or any combination of the measurements of connection quality, which in some embodiments may include but not limited to (1) throughput to and from a test server (for example, measured in Megabits per second) located in the Internet or within the cellular network, which includes the hot spot and cellular base station as intermediary nodes; (2) airtime allocated to the mobile device in a scheduling system (e.g. measured in microseconds per second in the case of TDMA, or bandwidth in the case of FDMA or codes in the case of CDMA or a combination of measures reflecting airtime), in one or both the upstream or downstream direction which may include the hot spot as a relay; (3) expected transmission time (ETT) of the mobile device when directly connected to a cellular base station or across two or more hops to the base station via any number of wireless links; (4) the received signal strength of the mobile device at its directly connected base station or hot spot; (5) the interference and noise level measured at the mobile device or hot spot (for example, measured in decibel milliwatts or dBmW); (6) the number of credits earned by the user of the mobile device in the cellular network; (7) the bitrate limit imposed by intermediate wireless links such as the hot spot which may reserve a fraction of the capacity for traffic originating and terminating at the hot spot (e.g. 500 kilobits per second or 50% of available capacity), leaving the remaining fraction for the mobile device; (8) the physical speed relative to the directly connected cell or hot spot (e.g. 45 miles per hour); (9) the combined battery consumption of the mobile device and hot spot to transmit a unit of data (e.g. joules per bit), (10) the credits of the mobile device.

The decision to choose between the 1st and 2nd routes based on measurements can be challenging due to following three unique characteristics of wireless links: time varying channels and resulting variable packet loss; the wireless links suffer from short term and long term fading and result in varying packet loss over different time scales. When the distance between the communicating mobile device 206 and hot spot 204 is large or if environment is obstacle rich and causes fading, the loss ratio of the link can be high. In an embodiment, a connection quality metric accurately captures this time varying packet loss. The packet transmission rate (or data rate) may vary depending upon the underlying physical layer technology. For example, 802.11a links have high data rate compared to 802.11b links. The data rate may also vary depending on the link loss characteristics when auto-rate control algorithms are used.

For an embodiment, a form of resource consumption is energy consumed by the intermediate node in the process of relaying (receiving and re-transmitting) the data packet from source to destination. With the wide deployment of battery powered wireless devices, prolonging the lifetime of batteries in mobile devices is becoming ever more critical. In one embodiment, credits are based on the battery consumption or energy consumption.

Every packet transmission and reception consumes energy from the battery of the hot spot. Control packets also consume energy. Thus, energy-efficient communication techniques are very important. In wireless networks, the power of a transmitted signal is attenuated at the rate of $1/d^n$, where d is the distance between the sender and receiver and n is the path loss exponent between 2 and 6. Under certain conditions, direct transmission of a data packet directly between mobile device and cellular network may require more transmission power and total energy than relaying the same packet via a hot spot which includes both the transmission from the mobile device to/from the hot spot and retransmission between the hot spot and cellular network. Accordingly resource consumption and connection quality may both be measured by (1) Total Transmission Power (TTP): The resource is measured by the transmission power. By admitting the mobile device, the hot spot may elect to forward packets on behalf of the mobile device and cellular network to reduce the transmission power; (2) Total Transceiving Power (TTCP) protocols: As the hot spot also consumes energy not only when forwarding packets but also when receiving packets, the transmission power as well as receiving power is added to the cost and quality metrics; (3) Total Reliable Transmission Power (TRTP) protocols: A link cost or quality should be a function of both the energy required for a single transmission attempt across the link and the link error rate, which determines the number of retransmission attempts needed for a successful transmission; (4) Link Layer Transceiver Power: energy consumption in sending control (or signaling) packets at the Data Link layer impacts resource consumption and connection quality. For example, in an 802.11 network, the energy consumption by the RTS, CTS and ACK packets accounts for a significant part of the total energy consumption.

For an embodiment, resource consumption and connection quality is related to the airtime consumed by the receiver or transmitter of the intermediate node. Wireless is a shared medium, meaning that all mobile devices operating on the same channel compete for the same limited bandwidth. The throughput of each of the mobile devices varies depending on the data rate it is using (e.g. 802.11 a/b/g/n) at any given point in time, and this data rate may vary multiple times per second or not. Received signal strength indicator (RSSI) values, Radio Frequency (RF) interference sources, signal blockage, and other factors play into a client device's instantaneous data rate. RF interference, inconsistent RF coverage, mobile devices connecting at the fringe of the cellular network or moving behind obstructions, and older mobile devices using legacy modulation mechanisms all lead to low data-rate connections. Slow mobile devices consume more airtime when transferring a given amount of data leaving less airtime for other mobile devices in a cell. Airtime hogging by mobile devices experiencing these issues decreases overall throughput capacity and degrades performance within the cellular network. Time division multiple access (TDMA) is a channel access method for shared medium networks. It allows several mobile devices to share the same frequency channel by dividing the signal into different time slots. The mobile devices transmit in rapid succession, one after the other, each using its own time slot. This allows multiple mobile devices to share the same transmission medium (e.g. radio frequency channel) while using only a part of its channel capacity. TDMA is used in the digital 2G cellular systems such as Global System for Mobile Communications (GSM), IS-136, Personal Digital Cellular (PDC) and iDEN, and in the Digital Enhanced Cordless Telecommunications (DECT) standard for portable phones. It is also used extensively in satellite systems, combat-net radio systems.

For an embodiment, resource consumption and connection quality depends on the transmitted wireless energy or interference caused by the hot spot and mobile device upon other receivers. Wireless links operating in unlicensed spectrum suffer from two kinds of interference: (1) Uncontrolled interference results from non-cooperating entities external to the network that use the same frequency band but do not participate in the MAC protocol used by mobile devices. For example, microwave ovens, Bluetooth devices operating in 2.4 GHz ISM bands interfere with 802.11b/g networks in the same band. (2) Controlled interference: This kind of interference results from broadcast nature of wireless links where a transmission in one link in the cellular network interferes with the transmissions in neighboring links. The interference of this kind depends on factors such as the topology of the network, traffic on neighboring links etc. It is well known that interference seriously affects the capacity of cellular networks. It is important for a connection quality metric to capture the potential interference experienced by the links to find connections that suffer less interference and improve the overall cellular network capacity. Interference can be either intra-path, wherein transmissions on links on the path between mobile device and cellular network (i.e. between mobile device and hot spot, and hot spot and cellular network) interfere or inter-path interference wherein, transmissions on links in separate paths interfere. If the connection between the mobile device and hot spot operates on a different channel (e.g. 2.4 GHz) than the connection between the hot spot and the cellular network (e.g. 700 MHz), then such a channel diverse path has less intra-flow interference which increases the throughput along the path because more links can operate simultaneously if they operate on different orthogonal channels. A good connection quality metric should find paths with component links that have low loss ratio, high data rate and experience low levels of interference.

Figure 3:
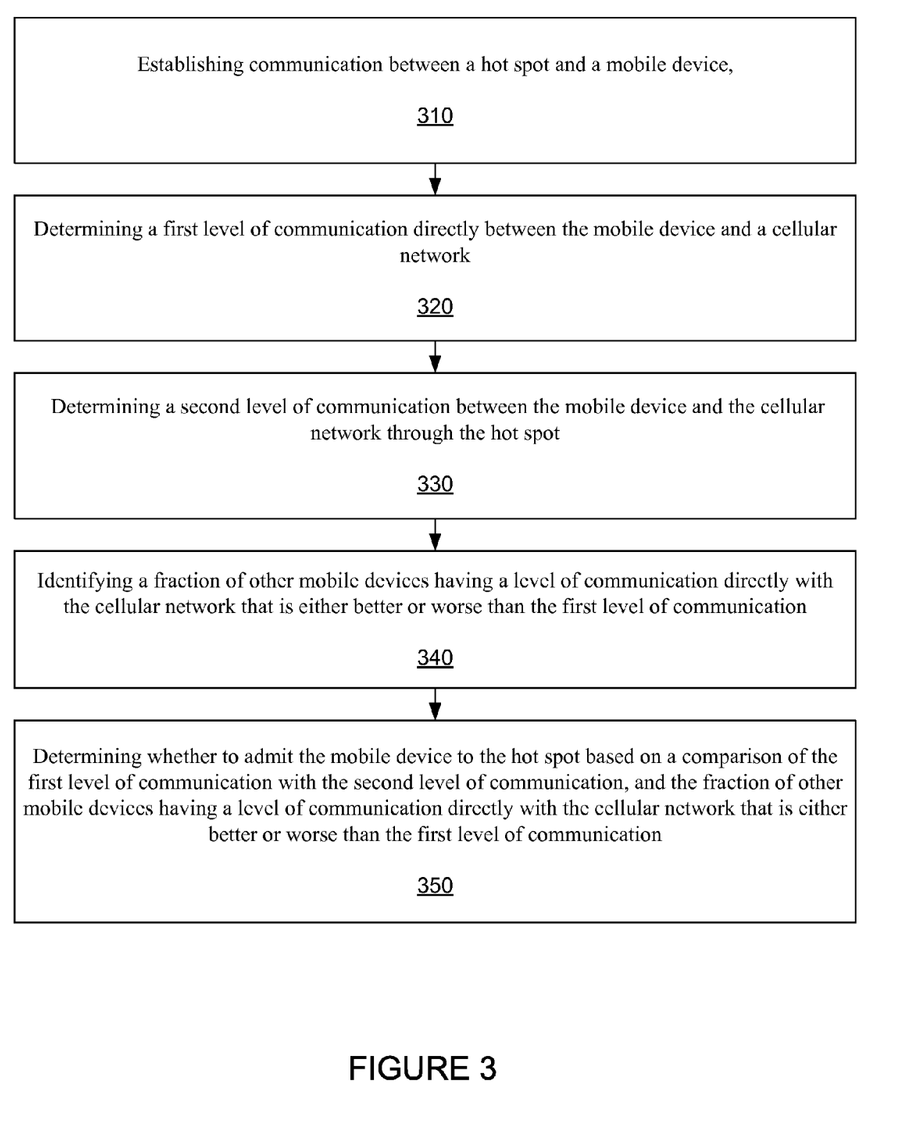
FIG. 3 is a flowchart of a method of admitting a mobile device to a hot spot, according to an embodiment.

FIG. 3 is a flowchart of a method of admitting a mobile device to a hot spot, according to an embodiment. A first step 310 includes establishing communication between a hot spot and a mobile device, wherein the hot spot comprises at least one of a fixed device hot spot or a mobile device hot spot. A second step 320 includes determining a first level of communication directly between the mobile device and a cellular network, wherein the first level of communication is based on at least one of a level of performance or a level of quality of communication directly between the mobile device and the cellular network. A third step 330 includes determining a second level of communication between the mobile device and the cellular network through the hot spot, wherein the second level of communication is based on at least one of a level of performance or a level of quality of communication between the mobile device and the cellular network through the hot spot. A fourth step 340 includes identifying a fraction of other mobile devices having a level of communication directly with the cellular network that is either better or worse than the first level of communication, wherein the level of communication is greater than a minimal threshold. A fifth step 350 includes determining whether to admit the mobile device to the hot spot based on a comparison of the first level of communication with the second level of communication, and the fraction of other mobile devices having a level of communication directly with the cellular network that is either better or worse than the first level of communication.

For an embodiment, determining whether to admit the mobile device to the hot spot based on a comparison of the first level of communication with the second level of communication, and the fraction of other mobile devices having a level of communication directly with the cellular network that is better than the first level of communication. For an embodiment, determining whether to admit the mobile device to the hot spot based on a comparison of the first level of communication with the second level of communication, and the fraction of other mobile devices having a level of communication directly with the cellular network that is worse than the first level of communication. Here, the fourth step 340 involves identifying how the direct connection (first level of communication) of the mobile device compares with other devices on the network. The usage of better or worse is applicable in the comparison. For example, if the first level of communication of the mobile device is better than that experienced by a fraction (T_min %) of other devices, the mobile device could be considered to experience a direct connection that is not at the bottom tier relative to the rest of the devices. In such cases, in the fifth step 350, the device may not be admitted to the hotspot. Alternatively, if the mobile device has a first level of communication that is worse than the first level of communication experienced by a fraction (T_min %) of other devices, the mobile device may be admitted to the hotspot. Therefore, the better or worse in this example can be used for comparison resulting in differing admission rules. This is just one example of using the comparison with fraction of other devices, and alternate schemes may be possible.

For at least some embodiments, admitting the mobile device to the hot spot includes allowing the mobile device to utilize resources of the hot spot to relay traffic between the mobile device and the cellular network. That is, admitting the mobile device to the hotspot entails usage of the hotspot's resources (in general) to relay traffic between the mobile device and the cellular network. For at least some embodiments, this includes sharing of air-time resources allocated to the hotspot, usage of battery at the hotspot, and/or limits on aggregate rate the hotspot may attain for its own traffic.

At least some embodiment further include determining a first level of communication directly between each of the other mobile devices and the cellular network, wherein the first level of communication is based on at least one of a level of performance or a level of quality of communication directly between each of the mobile devices and the cellular network, and determining a second level of communication between each of the other mobile devices and the cellular network through the hot spot, wherein the second level of communication is based on at least one of a level of performance or a level of quality of communication between each of the other mobile devices and the cellular network through the hot spot. Further, determining whether to admit the mobile device to the hot spot is further based on a comparison of the first level of communication directly between each of the other mobile devices and the cellular network with the second level of communication between each of the other mobile devices and the cellular network through the hot spot, within a specified geographic region.

For at least some embodiments, the other "mobile devices" refers to mobile devices other than the mobile device being considered for admission that are connected to the cellular network through the hot spot. The admission criteria for any of the other mobile devices to connect to the hotspot include a comparison of the first and second level of communication of the other mobile device. For an embodiment, the pool of other mobile devices considered for such comparisons are within a specific geographic area around the hotspot.

For an embodiment, determining whether to admit the mobile device to the hot spot further comprises determining a number of other mobile devices within a specified geographic region having a level of communication directly with the cellular network that is better than a minimal threshold and better or worse than the first level of communication. For an embodiment, this requires knowledge of the first level of communication between the other mobile devices and the cellular network. For an embodiment, this information is available at the cellular network using feedback channels from other mobile devices to the cellular network. For an embodiment, the cellular network then provides the "minimum threshold" for a given geographic area (where the hotspot is centered) to aid the hotspot or mobile devices in the admission decision. For at least some embodiments, each of the other mobile devices is connected to a cellular network at some known rate and that information is made available locally to the hotspot (directly) or via the cellular network (indirectly).

At least some embodiments further include determining a first level of communication directly between each of the other mobile devices and the cellular network, wherein the first level of communication is based on at least one of a level of performance or a level of quality of communication directly between each of the mobile devices and the cellular network, and determining a second level of communication between each of the other mobile devices and the cellular network through the hot spot, wherein the second level of communication is based on at least one of a level of performance or a level of quality of communication between each of the other mobile devices and the cellular network through the hot spot. Further, determining whether to admit the mobile device to the hot spot is further based on a comparison of the first level of communication directly between each of the other mobile devices and the cellular network with the second level of communication between each of the other mobile devices and the cellular network through the hot spot, of the other mobile devices connected to a specific cell in the cellular network. For this embodiment, the admission criteria involving comparison of the first level of communication of the mobile device with other devices only includes other devices directly connected to a specific cell. Both the mobile device considered for admission and other devices are directly connected to a specific cell directly. Such comparison may be more appropriate in some cases, since the comparison reflects the rank of the device relative to other devices connected to the same cell. In one of the previously described embodiments, the comparison includes other devices within a geographic area, which could encompass multiple cells, and potentially a larger area. In that embodiment, the experience of devices may have greater variability since multiple cells are spanned and additional variables are included, such as, network load etc. that may be different for each cell. For this embodiment, such dependencies are removed and the comparison is narrower focusing on the direct connection experience of devices connected to a specific cell.

At least some embodiments further include determining a third level of communication directly between the hot spot and the cellular network before the mobile device has been admitted, wherein the third level of communication is based on at least one of a level of performance or a level of quality of communication directly between the hot spot and the cellular network, and determining a fourth level of communication directly between the hot spot and the cellular network after the mobile device has been admitted. An embodiment includes determining whether to continue to admit the mobile device to the hot spot based on a comparison of the third level of communication with the fourth level of communication. An embodiment includes determining whether to admit the mobile device to the hot spot based on a comparison of the third level of communication with the fourth level of communication. For at least some embodiments, the fourth level is estimated. That is, for at least some embodiments, prior to admission of the mobile device to the hot spot, the fourth level of quality of connection of the mobile device via the hot spot may be estimated instead of measured. For at least some embodiments, the fourth level is estimated prior to admission. This enables a comparison prior to admission.

At least some embodiments further include providing credits to the hot spot for admitting the mobile device. At least some embodiments further include providing credits to the hot spot proportional to an improvement in an improvement in connection quality between the second level of communication and the first level of communication.

For at least some embodiments, the hot spot accumulates the credits. At least some embodiments further include the hot spot exchanging at least some of the accumulated credits to obtain resources from other hot spots to transmit data from the hot spot through the other hot spots.

For at least some embodiments, the determination of whether to admit the mobile device to the hot spot is further based on credits accumulated by the mobile device.

Figure 4:
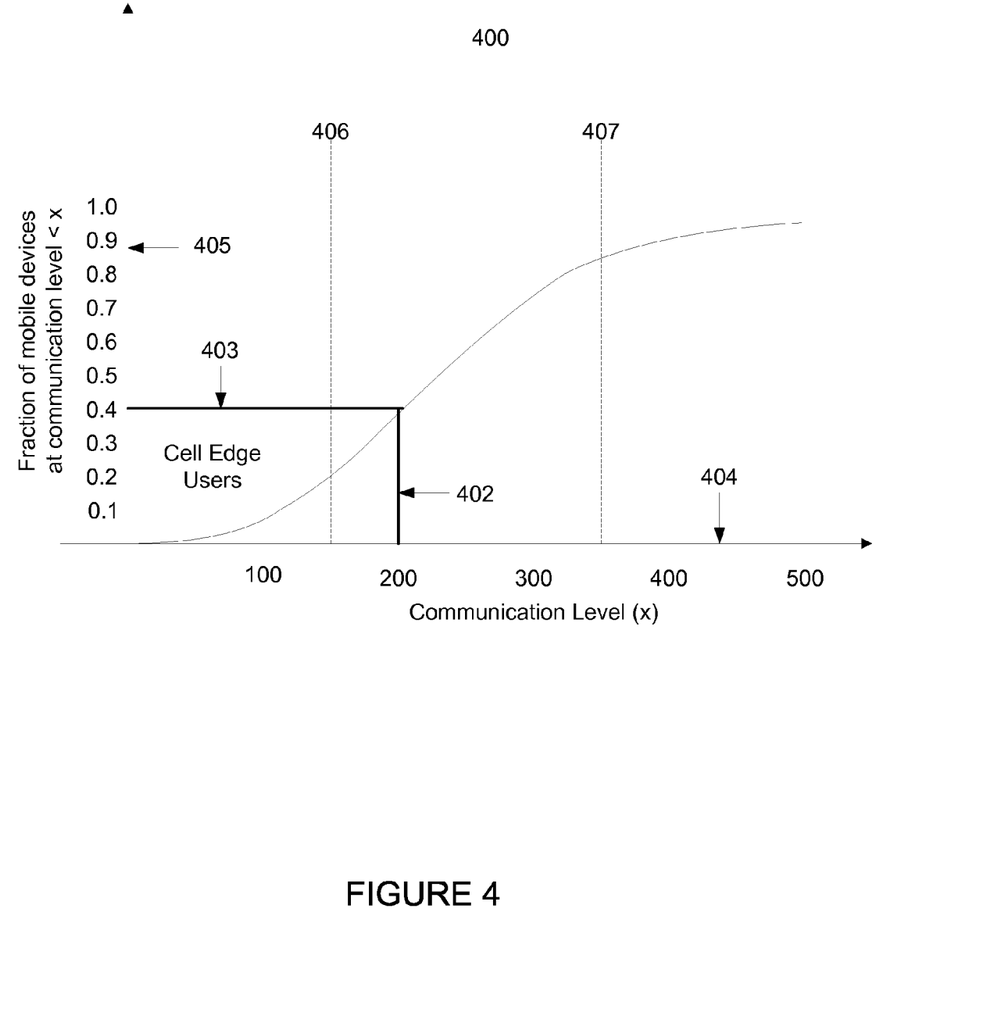
FIG. 4 is a plot of a cumulative distribution function of cell edge communication, according to an embodiment.

In the cellular network, each of the connected mobile devices experience different levels of communication quality at each point in time. FIG. 4 is a plot of a cumulative distribution function 400 of cell edge communication, according to an embodiment. The plot of FIG. 4 includes a graph of communication quality on the x-axis (404) versus fraction of mobile devices exceeding that communication quality on the y-axis (405). In this illustrative example, the mobile devices with a quality below a predetermined threshold (402) are defined as the cell edge although they may be alternatively defined as an arbitrary percentile 403 (e.g. the lowest 40%) between 0 and 100%. This may be due to path loss, multipath fading, interference in the network, external interference, and other wireless effects. Connecting the mobile devices in the cell edge that struggle the most to available hot spots can improve the connection quality by order of magnitude or more.

Mobile devices may attempt connect to nearby hot spots in order to improve their connections. If the hot spot is has a much better connection than the mobile device, and there is a high quality connection between the mobile device and hot spot then it is possible that the end-to-end path between the mobile device and Internet via the hot spot and its connected cell is also of high quality. This end-to-end quality needs to be measured independently but may be estimated based on the connection between the mobile device and the hot spot, and hot spot and the Internet.

Since the battery life is limited, the hot spot would run out of energy stored in the battery as a result of the connection of too many mobile active devices. In one embodiment, the hot spot may be programmed to reject all connections from mobile devices when its battery level falls below some predetermined threshold (e.g. 10%-30%) which would happen prematurely if too many mobile devices were actively connected to it. Furthermore if the hot spot is rapidly moving away from the mobile device, shut off or disconnected from the cellular network for any other reason, any connected mobile devices would experience a disconnection. Such events are unpredictable since the movements and status of the hot spot is not under control of the cellular network operator. If battery consumption on the hot spot and disconnection of the hot spot were not a concern, it would be advantageous for a larger fraction of the mobile devices on a cellular network to connect via hot spots. Hence it is useful to prioritize mobile devices in the cell edge to connect to the hot spots, while keeping the remaining mobile devices directly connected to the cellular network.

For at least some embodiments, there are at least four possibilities for a mobile device connected to the cellular network in the cell edge on a low quality connection. A first possibility includes there is no hot spot the mobile device can connect to. A second possibility includes all hot spots the mobile device can connect to offer no improvement in connection quality. A third possibility includes all hot spots the mobile device can connect offer an improvement in connection quality, but only a marginal improvement. A fourth possibility includes at least one hot spot which offers a large improvement in connection quality that it is worth connect to the cellular network via the hot spot.

In the last case (listed fourth possibility) it is worth it to the cellular network for the mobile device to change its connection to the hot spot. In all other cases it is useful for the device to remain connected to the cellular network directly. In one embodiment, mobile devices in the fourth case are encouraged to connect to hot spots. In another embodiment, mobile devices in the third case are also encouraged to connect to hot spots.

The decision to admit the mobile device 206 to the hot spot 204 (admission control decision) is illustrated in FIG. 3. In one embodiment, this is based on communication quality of the connection of the mobile device 206 to the cellular network. In one embodiment, the connection quality of the mobile divide 206 is measured as the first level of communication when the mobile device is directly connected to the cellular network (304) and second level when it is connected via the hot spot (305). In one embodiment, prior to admission of the mobile device to the hot spot, the second level of quality of connection of the mobile device via the hot spot may be estimated instead of measured. The computation and storage of the admission decision may be performed at the mobile device (202), the hot spot (204), or inside the cellular network (202) or in a server in the Internet or "the cloud" (201). In step 308, the first level and second level are compared. The comparison of the first level and second level for a mobile device can be defined in one of several methods to select for mobile devices in the cell edge. In one embodiment, the ratio or difference of the quality of the connection via the hot spot and the quality of the direct connection is used for comparison. (e.g. the second level is 240% of the first level). In one embodiment, a threshold test on the first level of communication of the directly connected mobile device is used for comparison (e.g. the first level is less than 100 kbps).

In another embodiment, the fraction of number of other mobile devices (e.g. 112, 114, 116) whose quality exceeds or falls below the first level of communication quality of the mobile device (e.g. 110) is used to determine whether to admit the mobile device to the hot spot. In example illustrated in FIG. 4, mobile device with first level 406 could be admitted to the hot spot because the first level falls below the threshold 402 which is worse than the communication level a fraction (403) of the other mobile devices in the cellular network. The fraction 403 may be chosen to be between 0 and 100%. In FIG. 4, the mobile device with communication level as indicated in 407 may not be admitted because the communication level is higher than 402. In one embodiment the communication of communication quality measurement data for other devices is collected and correlated in a centralized server and redistributed to the mobile devices as a threshold or cumulative distribution function or otherwise the admission decision need to be made in the cellular network (cloud).

Figure 5:
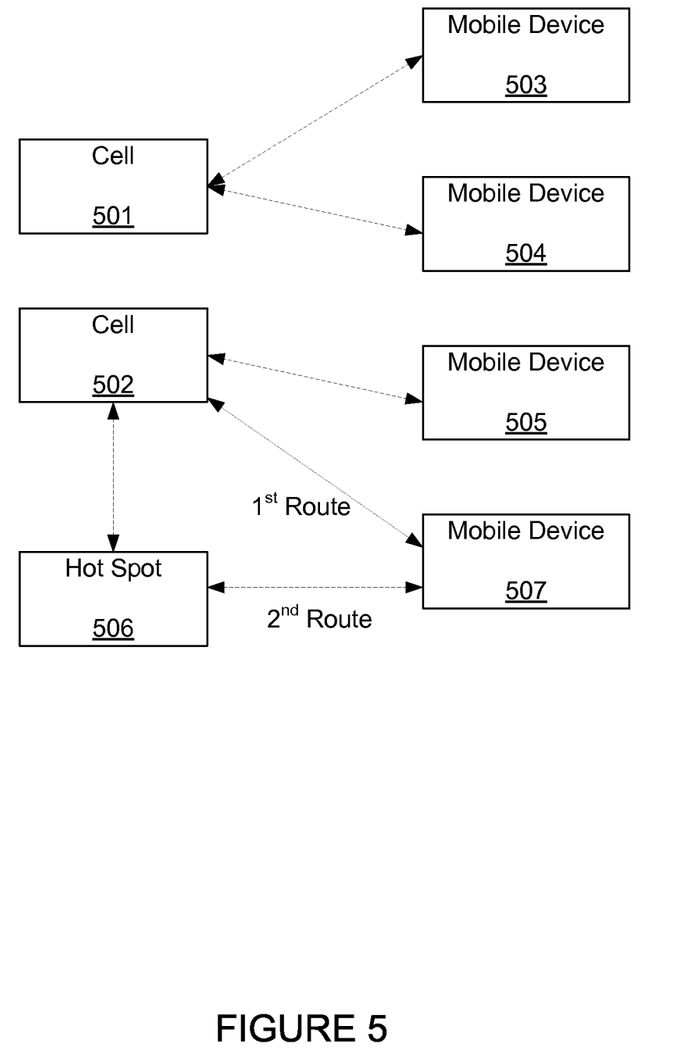
FIG. 5 is a block diagram that depicts of the selection or admission of mobile devices in based on the connected cell or geographic area, according to an embodiment.

For an embodiment, the other mobile devices in the cellular network under consideration for determining admission of the mobile device to the hot spot may be restricted to a certain geographic area or coverage area of a particular cell in the cellular network. This is further illustrated in illustrative example FIG. 5, where cell 501 of the cell network is connected to two mobile devices 503 and 504 while cell 502 is connected to mobile devices 505, 507, and hot spot 506. In one embodiment, 505 and 506 are the other devices whose quality is used to determine whether to admit the mobile device 507 while 503 and 504 are excluded because they are connected to another cell. In another embodiment global positioning system (GPS) or location information or signal information from each device is used to identify which devices are under consideration in the decision to admit mobile device 507 to hot spot 506.

Figure 6:
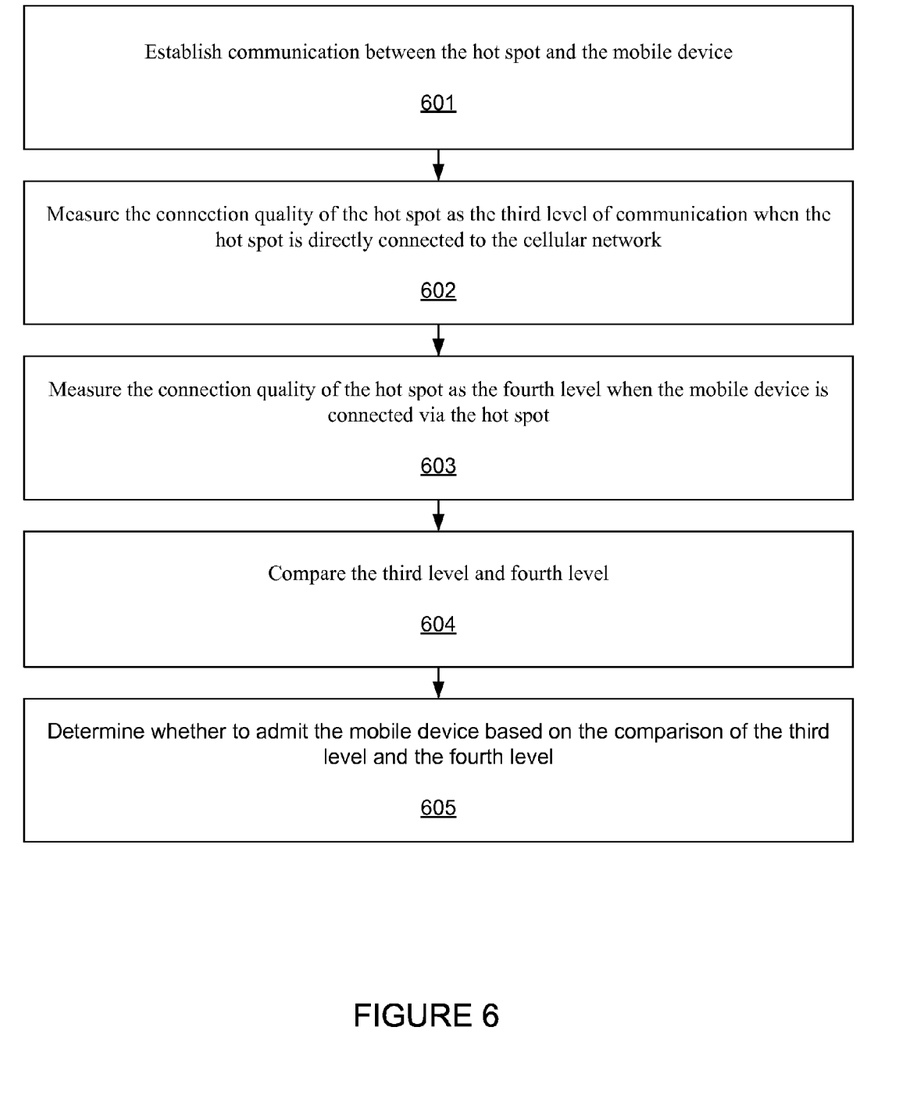
FIG. 6 is a flowchart of another method of admitting a mobile device to a hot spot, according to an embodiment.

FIG. 6 is a flowchart of another method of admitting a mobile device to a hot spot, according to an embodiment. Connecting the mobile device to the hot spot may reduce the quality of the connection that the hot spot owner enjoys by consuming bandwidth, data quota, or battery life. In order to prevent undue degradation in quality of the experience for the owner of the hot spot, the impact on the hot spot of admitting the mobile device must be taken into account. In one embodiment, after establishing communication between the hot spot and the mobile device (step 601), the connection quality of the hot spot 204 is measured as the third level of communication when the hot spot is directly connected to the cellular network (step 602) and fourth level when the mobile device is connected via the hot spot (step 603). In one embodiment, prior to admission of the mobile device to the hot spot, the fourth level of quality of connection of the mobile device via the hot spot may be estimated instead of measured. The computation and storage of the admission decision may be performed at the mobile device (206), the hot spot (204), or inside the cellular network (202) or in a server in the Internet or "the cloud" (201). In step 604, the third level and fourth level are compared. The comparison of the third level and fourth level for a mobile device can be defined in one of several methods to select for hot spots that will not have an impact. Further, the determination of whether to admit the mobile device is additionally based on the comparison of the third level and the fourth level (step 605). In one embodiment, the ratio or difference of the quality of the connection via the hot spot and the quality of the direct connection is used for comparison (for example, the third level is 80% of the fourth level). In one embodiment, a threshold test on the first level of communication of the hot spot is used for comparison (for example, the fourth level is less than 100 kbps).

Selfish resource consumption poses a particularly important problem for use of hot spots by the other mobile devices on cellular networks. It prevents network-wide collaboration between mobile devices to maximize reliability and spectral efficiency of the cellular network. The hot spots may be reluctant to consume these resources on behalf of other mobile devices, unless they also receive some benefit. To reward the hot spots, the cellular network can offer credits for providing a more efficient link for the owner of the hot spot to build up its credit score. The credit score may be accounted for on the mobile device or remotely outside the network. The credits can be accounted per packet or per flow from mobile device to cellular network, for each hot spot involved in relaying traffic.

Each hot spot can admit only a limited number of mobile devices between end points because traffic requests from each mobile device are unpredictable and random. This is in order to limit the amount of traffic relayed and resources consumed. In one embodiment, a hot spot may be prepared to accept only two or three mobile devices. The credit score may be used by the hot spot in the future for obtaining prioritized access (during admission control to another hot spot): the greater the number of accumulated credits the greater the preference that hot spots permit use of other hot spots (providing incentive to accumulate more credits). Or if the credit score increases beyond a threshold, admission is automatically given. Credits may also be deducted upon use.

Credits may also be given by the wireless operator of the cellular network to the hot spot based on the reduction of capacity consumed (analogous to net metering), in the form of a reduced monthly bill or wireless minutes or other financial incentive. For this it is important for the wireless operator to know by how much airtime (or interference) the mesh path has saved them versus going direct to the base station, which is used to calculate the credit to the subscriber.

Although specific embodiments have been described and illustrated, the embodiments are not to be limited to the specific forms or arrangements of parts so described and illustrated.

The invention claimed is:
1. A method comprising:
   establishing communication between a hot spot and a mobile device, wherein the hot spot comprises at least one of a fixed device hot spot or a mobile device hot spot;
   determining a first level of communication directly between the mobile device and a cellular network, wherein the first level of communication is based on at least one of a level of performance or a level of quality of communication directly between the mobile device and the cellular network;
determining a second level of communication between the mobile device and the cellular network through the hot spot, wherein the second level of communication is based on at least one of a level of performance or a level of quality of communication between the mobile device and the cellular network through the hot spot;
identifying a fraction of other mobile devices having a level of communication directly with the cellular network that is either better or worse than the first level of communication, wherein the level of communication is greater than a minimal threshold; and
determining whether to admit the mobile device to the hot spot based on: a comparison of the first level of communication with the second level of communication; and
the fraction of other mobile devices having a level of communication directly with the cellular network that is either better or worse than the first level of communication.

2. The method of claim 1, wherein admitting the mobile device to the hot spot comprises utilizing resources of the hot spot to relay traffic between the mobile device and the cellular network.

3. The method of claim 1, further comprising
determining a first level of communication directly between each of the other mobile devices and the cellular network, wherein the first level of communication is based on at least one of a level of performance or a level of quality of communication directly between each of the mobile devices and the cellular network;
determining a second level of communication between each of the other mobile devices and the cellular network through the hot spot, wherein the second level of communication is based on at least one of a level of performance or a level of quality of communication between each of the other mobile devices and the cellular network through the hot spot;
wherein determining whether to admit the mobile device to the hot spot is further based on a comparison of the first level of communication directly between each of the other mobile devices and the cellular network with the second level of communication between each of the other mobile devices and the cellular network through the hot spot, within a specified geographic region.

4. The method of claim 1, wherein determining whether to admit the mobile device to the hot spot further comprises determining a number of other mobile devices within a specified geographic region having a level of communication directly with the cellular network that is better than a minimal threshold and better or worse than the first level of communication.

5. The method of claim 1, further comprising
determining a first level of communication directly between the other mobile devices and the cellular network, wherein the first level of communication is based on at least one of a level of performance or a level of quality of communication directly between each of the mobile devices and the cellular network;
determining a second level of communication between each of the other mobile devices and the cellular network through the hot spot, wherein the second level of communication is based on at least one of a level of performance or a level of quality of communication between each of the other mobile devices and the cellular network through the hot spot;
wherein determining whether to admit the mobile device to the hot spot is further based on a comparison of the first level of communication directly between each of the other mobile devices and the cellular network with the second level of communication between each of the other mobile devices and the cellular network through the hot spot, of the other mobile devices connected to a specific cell in the cellular network.

6. The method of claim 1, further comprising:
determining a third level of communication directly between the hot spot and the cellular network before the mobile device has been admitted, wherein the third level of communication is based on at least one of a level of performance or a level of quality of communication directly between the hot spot and the cellular network;
determining a fourth level of communication directly between the hot spot and the cellular network after the mobile device has been admitted; and
determining whether to continue to admit the mobile device to the hot spot based on:
a comparison of the third level of communication with the fourth level of communication.

7. The method of claim 1, further comprising:
determining a third level of communication directly between the hot spot and the cellular network before the mobile device has been admitted, wherein the third level of communication is based on at least one of a level of performance or a level of quality of communication directly between the hot spot and the cellular network;
estimating a fourth level of communication directly between the hot spot and the cellular network after the mobile device has been admitted; and
determining whether to admit the mobile device to the hot spot based on:
a comparison of the third level of communication with the fourth level of communication.

8. The method of claim 1, further comprising providing credits to the hot spot for admitting the mobile device.

9. The method of claim 1, further comprising providing credits to the hot spot proportional to an improvement in an improvement in connection quality between the second level of communication and the first level of communication.

10. The method of claim 9, wherein the hot spot accumulates the credits.

11. The method of claim 10, further comprising the hot spot exchanging at least some of the accumulated credits to obtain resources from other hot spots to transmit data from the hot spot through the other hot spots.

12. The method of claim 1, wherein the determination of whether to admit the mobile device to the hot spot is further based on credits accumulated by the mobile device.

13. A hot spot, comprising:
a wireless transceiver;
a controller, wherein the controller is operative to:
establishing communication with a mobile device through the wireless transceiver;
obtain a first level of communication directly between the mobile device and a cellular network, wherein the first level of communication is based on at least one of a level of performance or a level of quality of communication directly between the mobile device and the cellular network;
determine a second level of communication between the mobile device and the cellular network through the hot spot, wherein the second level of communication is based on at least one of a level of performance or a level of quality of communication between the mobile device and the cellular network through the hot spot;

identify a fraction of other mobile devices having a level of communication directly with the cellular network that is either better or worse than the first level of communication, wherein the level of communication is greater than a minimal threshold; and determine whether to admit the mobile device to the hot spot based on:

a comparison of the first level of communication with the second level of communication; and the fraction of other mobile devices having a level of communication directly with the cellular network that is either better or worse than the first level of communication.

14. The hot spot of claim 13, wherein admitting the mobile device to the hot spot comprises utilizing resources of the hot spot to relay traffic between the mobile device and the cellular network.

15. The method of claim 13, wherein the controller is further operative to:

determine a first level of communication directly between each of the other mobile devices and the cellular network, wherein the first level of communication is based on at least one of a level of performance or a level of quality of communication directly between each of the mobile devices and the cellular network;

determine a second level of communication between each of the other mobile devices and the cellular network through the hot spot, wherein the second level of communication is based on at least one of a level of performance or a level of quality of communication between each of the other mobile devices and the cellular network through the hot spot;

wherein determining whether to admit the mobile device to the hot spot is further based on a comparison of the first level of communication directly between each of the other mobile devices and the cellular network with the second level of communication between each of the other mobile devices and the cellular network through the hot spot.

16. The hot spot of claim 13, wherein the controller is further operative to acquire credits for admitting the mobile device.

17. The hot spot of claim 13, wherein the controller is further operative to acquire credits proportional to an improvement in an improvement in connection quality between the second level of communication and the first level of communication.

18. The hot spot of claim 17, wherein the controller is further operative to accumulate the credits.

19. The hot spot of claim 18, wherein the controller is further operative to exchange at least some of the accumulated credits to obtain resources from other hot spots to transmit data from the hot spot through the other hot spots.

20. The hot spot of claim 13, wherein the determination of whether to admit the mobile device to the hot spot is further based on credits accumulated by the mobile device.

21. A system, comprising:

a cellular network controller;

a hot spot, wherein the hot spot communicates with the cellular network, and wherein the hot spot comprises:

a wireless transceiver;

a controller, wherein the controller is operative to:

establishing communication with a mobile device through the wireless transceiver;

wherein at least one of the controller and the cellular network controller are operative to:

obtain a first level of communication directly between the mobile device and a cellular network, wherein the first level of communication is based on at least one of a level of performance or a level of quality of communication directly between the mobile device and the cellular network;

determine a second level of communication between the mobile device and the cellular network through the hot spot, wherein the second level of communication is based on at least one of a level of performance or a level of quality of communication between the mobile device and the cellular network through the hot spot;

identify a fraction of other mobile devices having a level of communication directly with the cellular network that is either better or worse than the first level of communication, wherein the level of communication is greater than a minimal threshold; and determine whether to admit the mobile device to the hot spot based on:

a comparison of the first level of communication with the second level of communication; and the fraction of other mobile devices having a level of communication directly with the cellular network that is either better or worse than the first level of communication.

* * * * *